(12) United States Patent
Liu et al.

(10) Patent No.: US 7,897,255 B2
(45) Date of Patent: *Mar. 1, 2011

(54) POROUS WASHCOAT-BONDED FIBER SUBSTRATE

(75) Inventors: James Jenq Liu, Mason, OH (US); Bilal Zuberi, Cambridge, MA (US)

(73) Assignee: GE02 Technologies, Inc., Woburn, MA (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/851,233

(22) Filed: Sep. 6, 2007

(65) Prior Publication Data

US 2009/0068438 A1 Mar. 12, 2009

(51) Int. Cl.
*D02G 3/00* (2006.01)
*B28B 3/20* (2006.01)
(52) U.S. Cl. ......... 428/361; 428/375; 428/378; 428/379; 428/380; 264/176.1; 264/638
(58) Field of Classification Search .................. 428/361, 428/375, 378, 379, 380; 264/176.1, 638
See application file for complete search history.

(56) References Cited

U.S. PATENT DOCUMENTS

| 4,416,676 | A | * | 11/1983 | Montierth | ........................ 55/523 |
| 5,750,026 | A | * | 5/1998 | Gadkaree et al. | .......... 210/502.1 |
| 6,156,685 | A | | 12/2000 | Marella et al. | |
| 2002/0157358 | A1 | * | 10/2002 | Noda et al. | ................... 55/282.3 |
| 2003/0178357 | A1 | * | 9/2003 | Wolff et al. | ................... 210/263 |
| 2005/0042151 | A1 | | 2/2005 | Alward et al. | |
| 2006/0120937 | A1 | | 6/2006 | Zuberi | |
| 2007/0108647 | A1 | | 5/2007 | Zuberi et al. | |
| 2007/0152364 | A1 | | 7/2007 | Zuberi et al. | |

FOREIGN PATENT DOCUMENTS

| WO | WO-00/01463 | 1/2000 |
| WO | WO-2006/030189 | 3/2006 |

OTHER PUBLICATIONS

"Catalytic Coating & Materials", *DieselNet Technology Guide—Emission Control Catalysts*, www.DieselNet.com,(Jun. 2005).

* cited by examiner

*Primary Examiner* — Norca L Torres-Velazquez

(57) ABSTRACT

A porous substrate and method of forming a porous substrate including providing a fiber material, providing at least one extrusion aid, and providing at least one washcoat precursor. The fiber material, the at least one extrusion aid and the at least one washcoat precursor are mixed to provide an extrudable batch. The extrudable batch is extruded into a green substrate. The green substrate is fired to form a porous rigid substrate and to form a washcoat at least partially coating the fiber material.

18 Claims, 3 Drawing Sheets

POROUS WASHCOAT-BONDED FIBER SUBSTRATE

FIELD OF THE INVENTION

The present invention relates to the in-situ formation of washcoat in porous substrates and more specifically to porous washcoat-bonded substrates formed from fibrous materials.

BACKGROUND

Porous substrates are available for various filtration and separation processes. For example, porous substrates with catalytic materials deposited on the substrate are commonly used to reduce particulate emissions and convert toxic exhaust gas into less toxic gases. In certain applications, the chemical conversion is also a useful step in synthesis of intermediate or final compounds. Substrates that have relatively high porosity (i.e., percentage of void space in the material) and relatively high thermal shock resistance (e.g., due to low thermal expansion) may provide the greatest efficiency and effectiveness.

Porosity is generally defined as the percentage of void space in a material. For example, in a substrate with 50% porosity, half of the volume of the substrate is void or open space within the substrate material. Higher porosity in a substrate corresponds to a lower mass per volume in the substrate, which is beneficial when the application requires an elevated operational temperature. For example, when a substrate is used in a catalytic process requiring a high operational temperature, a substrate with a low thermal mass will heat to the operational temperature faster than a substrate with a higher thermal mass, resulting in a shorter light off time for the catalyst.

While porosity is important for filtration and emissions control substrates, even a highly porous substrate is ineffective as a filter where gases have to flow through the filtration medium if it isn't also highly permeable. Permeability is generally defined as the measure of the ability of a material to transmit fluids. For example, in an emissions application, a highly porous substrate cannot effectively filter and convert the exhaust from a vehicle if the exhaust gas cannot flow through the substrate. Thus, it is important for the pores to be interconnected in order to obtain optimal flow through.

Substrates used as a support for catalytic reactions are typically coated with a washcoat, or a high surface area carrier coating, which may be subsequently catalyzed through the addition or impregnation of precious metals or catalytic materials. The washcoat provides high surface area for the dispersion of and stabilization of catalytic materials. In honeycomb substrates, such as the type typically used in exhaust emission controls, the washcoat is deposited over the entire wall of the honeycomb channels. In this flow-through configuration, the limitations on the amount of washcoat coating are dictated by the backpressure resulting from channel size reduction. In a porous substrate, particularly when configured in a wall-flow configuration as a filter, the washcoat limitations are dictated by the backpressure resulting from a reduction in porosity and permeability as the washcoat materials fill the void space within the porous substrate.

The washcoat materials are typically applied through the use of an aqueous slurry of a colloidal suspension of the washcoat materials, such as alumina powder and/or other refractory oxides, or from solution based methods. In the case of a slurry process, the washcoat materials are dispersed in an acidified water-based solution, and mixed using a high shear mixing process. The particle size of the washcoat materials must be carefully controlled to ensure proper adhesion and penetration when applied to the substrate material, and the viscosity of the slurry must be carefully controlled. The slurry is applied to the substrate, typically by pouring the solution into the substrate, which is then dried and calcined. In the case of a solution process, washcoat components, usually in the form of soluble salts in an aqueous solution that are applied to the substrate, dried and then calcined.

Extrusion of ceramic powder materials, and subsequent washcoat loading has proven to be an effective and cost efficient method of producing ceramic substrates for the environmental controls industry. However, there is an upper limit to the porosity in extruded ceramic powder materials that, if exceeded, results in low strength and decreased functionality. Further, porosity of a fired substrate may be reduced in post-production catalyst deposition, in which a washcoat, or surface enhancer, and/or precious metal catalyst material is applied to the finished substrate, potentially filling in voids, or pores, in the substrate.

In addition, the deposition of the washcoat to a fired ceramic honeycomb substrate adds an extra step in the processing and increases the cost of the washcoated substrate. Often, when a high washcoat loading is required, multiple washcoat processing steps have to be taken, which increase the cost and reduce uniformity of the washcoat loading.

Thus, there exists a need for a high-porosity filter substrate in which the washcoat and/or catalyst is included during production.

SUMMARY

The present disclosure provides porous washcoat-bonded fiber substrates.

In general, in one aspect, a method of forming a porous washcoat-bonded fiber substrate includes providing a fiber material, providing at least one extrusion aid, and providing at least one washcoat precursor. The fiber material, the at least one extrusion aid and the at least one washcoat precursor may be mixed to provide an extrudable batch. The extrudable batch may be extruded into a green substrate. The green substrate may be fired to form a porous rigid substrate and to form a washcoat at least partially coating the fiber material.

The method may feature one or more of the following aspects. In some implementations, a fluid may be mixed with the extrudable batch of fiber material, at least one extrusion aid, and at least one washcoat precursor.

The fiber material may include one or more of a metallic fiber, intermetallic fiber, a polymeric fiber, and a ceramic fiber. The at least one washcoat precursor may include at least one of sodium oxide, aluminum phosphate, aluminum nitrite, aluminum chloride, perovskites, zeolite, alumina sol, boehmite, cerium oxide, ruthenium oxide, silica, silica sol, alumina, zirconium oxide, hafnium oxide, activated carbon, barium oxide and titanium oxide. The rigid substrate may have a porosity of greater than 40 percent.

Firing the green substrate may include drying the green substrate. The green substrate may be heated, including volatilizing at least a portion of the at least one extrusion aid. The green substrate may be sintered to form bonds between the at least one washcoat precursor and the fiber material. The green substrate may be sintered at a temperature below 1000° C. The green substrate may be sintered to form at least one of glass bonds and ceramic bonds between the at least one washcoat precursor and the fiber material, strengthening the rigid substrate.

In another embodiment a pore former may be added to enhance porosity, through the addition of a volatile or organic material, such as carbon or resin particles. Additionally, a rigidizer may be added with the washcoat material and the fibers, such as colloidal sols and ceramic cements, that would rigidize and provide strength to the structure after drying, heating or firing.

In general, in another aspect, the invention features a porous washcoat-bonded fiber substrate including an extruded composition of a fiber material, at least one extrusion aid, and at least one washcoat precursor material. The extruded composition may be fired to enable bond formation between the fiber material to provide strength and porosity.

One or more of the following features may be included. In some embodiments, the extruded composition may include a fluid. The washcoat precursor material may act as a bonding phase material, coating the fiber material. In some embodiments, the washcoat may occupy some of the pore volume (porosity) that is present in the porous substrate.

The fiber material may include one or more of a metallic fiber, intermetallic fiber, a polymeric or resin fiber, carbon fiber and a ceramic fiber. The at least one washcoat precursor material may include at least one of sodium oxide, aluminum phosphate, aluminum nitrite, aluminum chloride, perovskites, zeolite, alumina sol, boehmite, cerium oxide, ruthenium oxide, silica, silica sol, alumina, zirconium oxide, hafnium oxide, activated carbon, barium oxide and titanium oxide. The porous fiber washcoat-bonded substrate may have a porosity of greater than 40 percent after firing.

The porous washcoat-bonded fiber substrate may be fired to dry the extruded composition. During firing, any rigidizer in the substrate may also extend support and strength to the structure, the extruded composition may be heated to volatilize at least a portion of the at least one extrusion aid and/or any pore formers. The extruded composition may be sintered to form bonds between the at least one washcoat precursor material and the fiber material. The extruded composition may be sintered at a temperature below 1000° C. The extruded composition may be sintered to form at least one of glass bonds and ceramic bonds between the at least one washcoat precursor material and the fiber material.

Details of one or more implementations are set forth in the accompanying drawings and the description below. Other features and advantages of the invention are apparent from the following description, the drawings and the claims.

DETAILED DESCRIPTION

Figure 1:
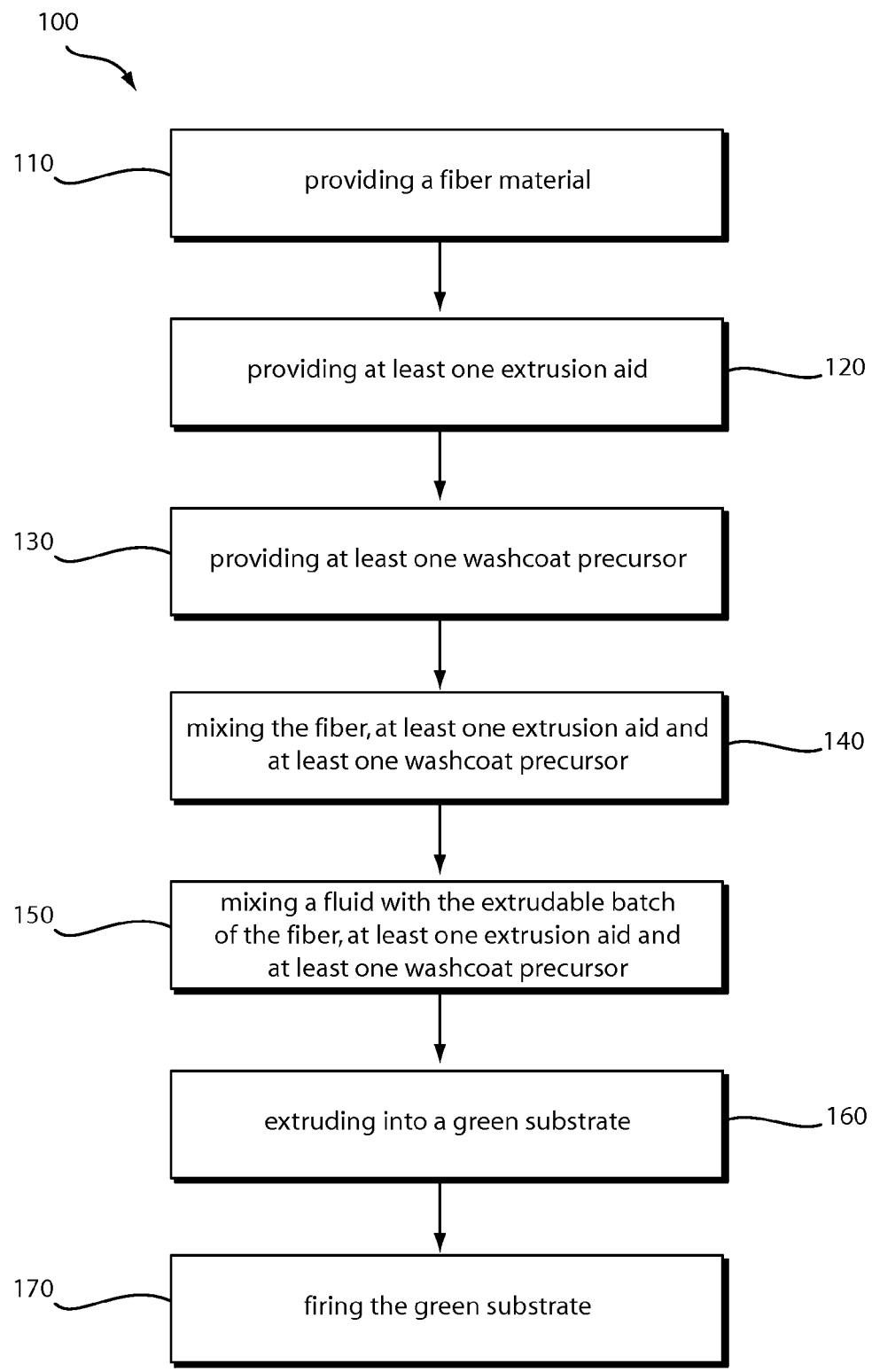
FIG. 1 is a flowchart of an exemplary method of forming a porous washcoat-bonded fiber substrate.
Figure 2:
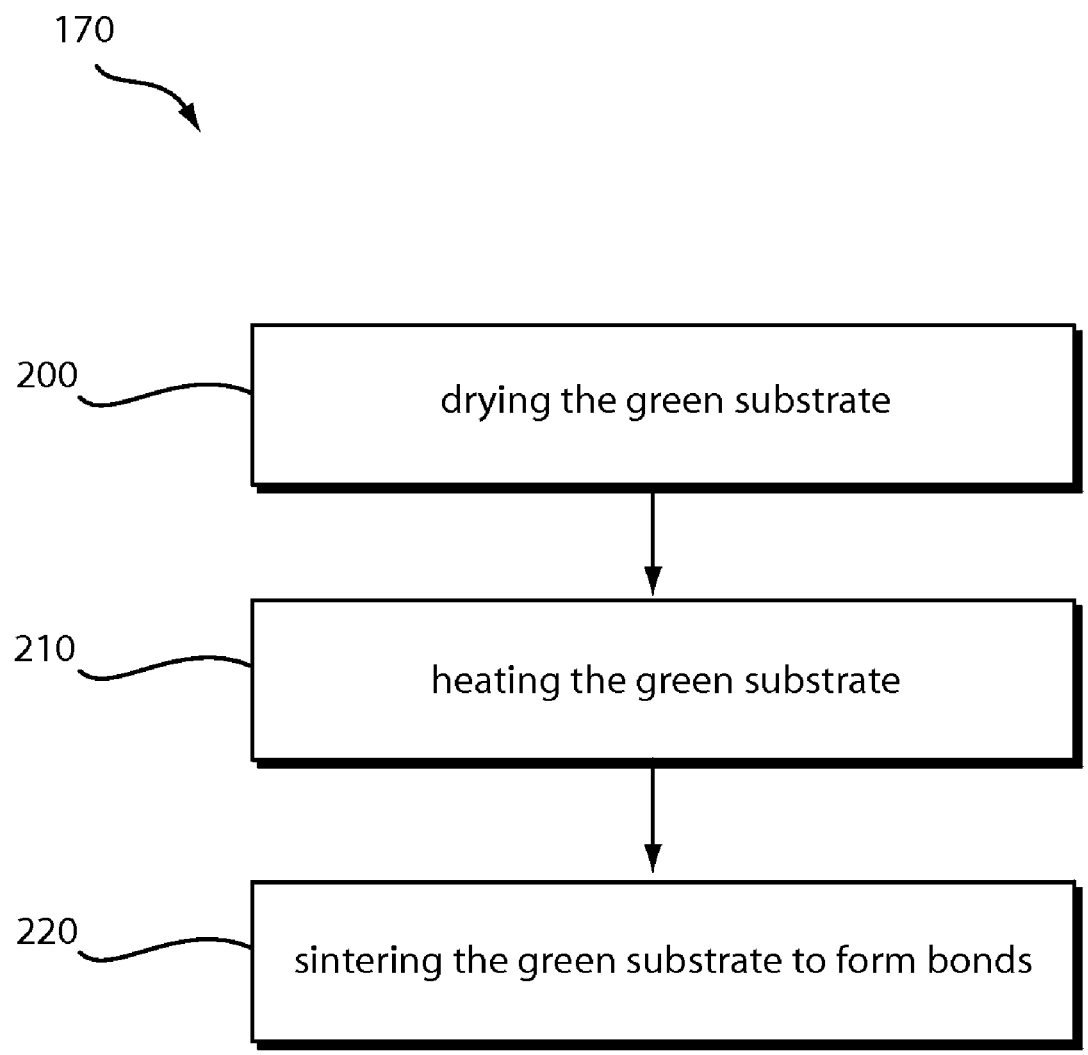
FIG. 2 is a flow chart of an exemplary method of firing a green substrate.
Figure 3:
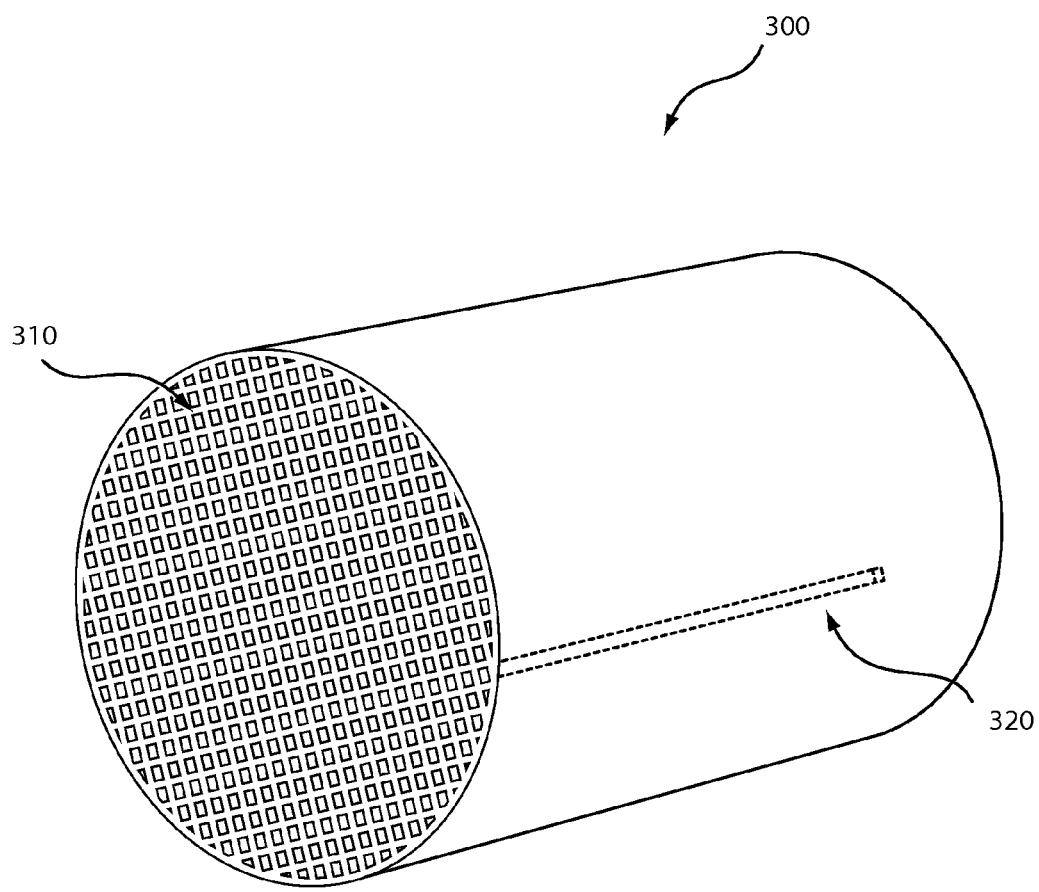
FIG. 3 is an illustration of an exemplary substrate with honeycomb cross section.

Referring to FIGS. 1, 2 and 3, an exemplary porous washcoat-bonded fiber substrate 300 may be formed according to an exemplary method 100 described herein. The method 100 of forming a porous washcoat-bonded fiber substrate may include providing 110 a fiber material. A fiber may be generally defined as a material having an aspect ratio greater than one, as compared to powder, for which the particles may have an aspect ratio of about one. The aspect ratio is the ratio of the length of the fiber divided by the diameter of the fiber. The fiber diameter can be in the range of about 0.2 to 30 microns in diameter, though in applications such as filtration, the fiber diameter may typically be in the range of about 3 to 10 microns. The fibers may be chopped or milled to any of a variety of lengths, e.g., to provide for convenience in handling, to provide more even distribution of fibers in the mix, and to obtain desired properties in the final substrate. Shearing forces imparted on the fibers during subsequent mixing 140 may shorten at least a portion of the fibers. The fibers may have a desired length to diameter aspect ratio of between about 1 and 1,000 in their final state after extrusion. In further embodiments, the aspect ratio of the fibers may be in the range of about 1 to 100,000. The fiber material may be selected from a variety of metallic, intermetallic, high temperature polymeric, resin, carbon and/or ceramic fibers, such as, but not limited to, alumina fibers, silica fibers, aluminosilicate fibers, graphite, biosoluble fibers, calcium aluminosilicate fibers, barium aluminosilicate fibers, borosilicate fibers, or carbon fibers, nickel fibers, and titanium fibers for example. Additionally, high surface area fibers, such as high surface area alumina fibers, may also be used.

At least one extrusion aid may also be provided 120. Extrusion aids such as organic binders may typically be polymeric materials that, for example, when added to a suspension of particles may aid in adjusting the rheology of the suspension, e.g., through dispersion or flocculation of the particles. Water soluble organic binders, such as hydroxypropyl methyl cellulose, may work advantageously for extrusion applications, though other binders and/or mixtures of multiple binders may be used. For example, in a suspension that is too fluid for extrusion, a binder may be added to thicken, or increase the apparent viscosity of the suspension. A plastic suspension may have a relatively high shear strength, which may facilitate extrusion. In extrusion applications, binders may aid in providing plasticity and obtaining desired flow characteristics that may aid in extrusion of the material. Additionally, binders may be used to help improve the pre-firing, or green strength, of an extruded substrate. While the addition of an organic binder material has been described, other extrusion aids and/or additives may be used to aid in controlling the rheology of the fiber mixture or suspension.

At least one washcoat precursor may also be provided 130, e.g., to allow the inclusion of other materials for bonding in the final structure, enabling the in situ formation of final washcoat material within the final substrate structure. The washcoat precursor may also aid in adjusting the rheology of the mixture, aid in increasing porosity in the final fired substrate, and increase the strength of the final fired substrate. The washcoat precursor may be spherical, elongated, fibrous, or irregular in shape. The washcoat precursor may be a material or combination of materials, which upon firing, would transform into or otherwise result in a material commonly used as a post-production washcoat. For example, the washcoat precursor material may be sodium oxide (chemical formula, NaO), aluminum phosphate ($Al_3PO_4$), aluminum nitrite ($AlNO_3$), aluminum chloride ($AlCl_3$), perovskites ($CaTiO_3$), zeolite (a family of sodium aluminosilicate materials), alumina sol (AlOOH), boehmite ($\gamma$-$Al_2O_3$), silica ($SiO_2$), cerium oxide (CeO or $CeO_2$), ruthenium oxide ($RuO_2$) and titanium oxide ($TiO_2$), though other washcoat precursor materials may be used, including, but not limited to, silica sol, alumina, zirconium oxide ($ZrO_2$), hafnium oxide ($HfO_2$), activated carbon, or barium oxide (BaO).

The washcoat precursor material may aid in adjusting the rheology of the mixture or extrudable batch (discussed in more detail below) by assisting in suspension and dispersion of the fibers. The washcoat precursor, or washcoat material, may also be added in the form of a solution which then crystallizes washcoat upon drying and firing. The washcoat precursor may also aid in the formation of porosity in a number of ways. For example, the washcoat precursor may assist in fiber alignment and orientation by arranging fibers into an overlapping pattern to facilitate proper bonding between fibers during firing. The arrangement of the fibers may help to increase the strength of the final fired substrate. The washcoat precursors can include rigidizers, such as colloidal sols or ceramic cements, that promote the formation of bonds between the fibers during firing 170. Additionally, the washcoat precursor may modify the surface of the fiber by etching or reaction of the fiber surface and/or by forming a nano-scale or micro-scale washcoat layer on the surface during firing. For example, small particles of washcoat precursor material 130 may be distributed over the surface of the fibers and bond to the surface of the fiber during firing 170 (described in more detail below). In this way, the surface area of the fiber is enhanced through the addition of the washcoat particles bonded thereto. Further, the washcoat precursor material 130 distributed over the surface of the fibers may react with the fiber to create a compound that results in a local modification of the surface of the fiber. In this way, the fiber surface can be modified during firing 170 to provide enhanced surface area and/or chemical composition.

The washcoat precursor material may be provided 130 by a variety of methods. For example, in embodiments in which zeolite is the desired oxidation catalyst in the final fired substrate, a zeolite may be provided 130 as the washcoat precursor. Alternatively, materials that may result in zeolite upon firing and processing, such as boehmite ($\gamma$-$Al_2O_3$) and sodium oxide (NaO), may be provided 130 as washcoat precursor materials. Another method of producing a zeolite washcoat may involve using a sol gel composed of zeolite components as the washcoat precursor. The sol gel composed of zeolite components may result in zeolite formation during firing.

In other embodiments, alumina (e.g., boehmite ($\gamma$-$Al_2O_3$)) and/or an aluminum sol, such as aluminum phosphate ($Al_3PO_4$), aluminum nitrite ($AlNO_3$), and aluminum chloride ($AlCl_3$), may be provided 130 as a washcoat precursor. When alumina and/or an aluminum sol is provided as the washcoat precursor, the washcoat precursor may result in the formation of alumina and/or a glassy layer (e.g., a phosphate glass) during firing. The alumina and/or glassy phase may assist in bonding between fibers, forming a network between fibers, which, in turn, may result in higher strength and porosity.

In other embodiments, cerium oxide (CeO or $CeO_2$), ruthenium oxide ($RuO_2$) and titanium oxide ($TiO_2$), alone or in combination with alumina, may be used as the washcoat precursor. When cerium oxide, ruthenium oxide and titanium oxide are provided 130 as the washcoat precursor, the cerium, ruthenium and titanium may go through reduction during firing. The reduction of the cerium oxide, ruthenium oxide and titanium oxide compounds results in the surface modification of the fiber, or a change of the fiber surface on an atomic scale. For example, copper on the surface of an alumina fiber, or an alumina-based fiber such as aluminosilicate fiber, may form $CuAlO_x$. Further, a sodium oxide contained in the washcoat precursor may increase the formation of an isomorphic form of alumina, or $\beta$-alumina.

The fiber, the at least one extrusion aid, and the at least one washcoat precursor may be mixed 140. Mixing 140 the fibers, the at least one extrusion aid (e.g., an organic binder), and the at least one washcoat precursor, may enable suspension of the fibers in the fluid. A fluid may also be mixed 150 with the fiber, the at least one extrusion aid, and the at least washcoat precursor to aid in suspension of the mixture. Once the fibers are suspended, the rheology of the suspension may be further adjusted for extrusion as needed. The fibers, organic binder, washcoat precursor and fluid, if needed, may be mixed 140, 150, e.g., using a high-shear mixer, which may provide relatively high dispersion of the fibers and may aid in producing the desired plasticity for a particular processing application, e.g., extrusion. In an embodiment in which the suspension may include less than about 60 volume percent fiber, a resulting substrate may have greater than about 40% porosity. Deionized water may be used as the fluid for suspension, though other fluids such as ionic solutions may be used.

The mixture of the fiber, the at least one extrusion aid, the at least one washcoat precursor, the fluid, and any other materials included in the mixture, may be extruded 160 to form a green substrate (i.e., an unfired extruded article). The mixture of fiber, the at least one extrusion aid, the at least one washcoat precursor, and the fluid may be extruded 160 using an extruder that may be, for example, a piston extruder, a single screw, or auger, extruder, or a twin screw extruder. The mixture of fiber, extrusion aid, washcoat precursor, fluid and other ingredients may be extruded 160 through a die, e.g., configured to produce a "honeycomb" cross section 310. The honeycomb cross section 310 may be generally characterized by cells 320 that may run the length of the substrate 300. Substrates 300 with the honeycomb cross section 310 are often described by number of cells 320 per square inch.

The extruded 160 green substrate may be fired 170, enabling consolidation and bond formation between fibers and may ultimately form a porous washcoat-bonded fiber substrate. Firing 170 may include several processes, e.g., which may exist as discrete processes or may be realized during the course of a single firing process. The green substrate may be dried 200 in order to remove a substantial portion of the fluid, e.g., through evaporation. Drying 200 may be controlled in order to limit defects, e.g., resulting from gas pressure build-up or differential shrinkage. Drying 200 may be conducted in open air, by controlled means, such as in a convection, conduction or radiation dryer, or within a kiln.

Firing 170 the green substrate may also include heating 210 the green substrate. As the green substrate is heated 210, the extrusion aid may begin to burn off. Most organic binders may burn off at temperatures between about 200° C. and 400° C. The increase in temperature may cause the hydrocarbons in the polymer or other organic materials to degrade and vaporize, which may result in weight loss. Similarly, any chlorine in aluminum chloride may volatilize, leaving aluminum particles behind for oxidation and bonding. The organic binder burn off and chemical volatilization may enable fiber-to-fiber contact or washcoat precursor-to-fiber contact, and may form an open pore network.

In one embodiment hollow spheres made of washcoat material may be used as pore-forming material. In such a case, when heated, the spheres would melt, leaving behind a bonded washcoated fiber based substrate. The spheres could be made, for example, of silica, alumina, or other compositions.

The dried green substrate may be sintered 220 to enable the formation of bonds between fibers. Sintering 220 may generally involve the consolidation of the substrate, which may be characterized by the formation of bonds between the fibers to form an aggregate with strength. Several types of bonds may form during sintering 220. The types of bonds formed during sintering 220 may depend upon multiple factors, including, but not limited to, for example, the starting materials and the time and temperature of sintering 220. Typically, glass bonds and ceramic bonds may form between the at least one washcoat precursor and the fiber material. Glass bonding may be characterized by the formation of a glassy or amorphous phase at the intersection of fibers. In other instances, glass-ceramic bonds and covalent or oxide bonds may form by consolidation of a region between fibers. Glass-ceramic, and covalent/oxide bonding may be characterized by grain growth and mass transfer between overlapping fibers. Glass bonds may typically occur at lower temperatures than covalent/oxide bonds.

Sintering may be done over a range of temperatures, depending upon the washcoat precursor. In embodiments where zeolites and materials that may result in zeolites, aluminum phosphate, aluminum nitrite and aluminum chloride are used as a washcoat precursor, sintering may be done in an oxidative or a reducing atmosphere at temperatures below 1000° C. It may be necessary to maintain the sintering temperature during firing to be less than the temperature at which the washcoat precursor may agglomerate into larger particles. In various implementations, sintering may be carried out at temperatures between about 450° C. and 600° C. To accomplish etching of the fiber on an atomic scale, using cerium oxide, ruthenium oxide and titanium oxide as the washcoat precursor, for example, sintering may be carried out in a reducing atmosphere and/or in oxygen partial pressure atmosphere, at temperatures of approximately 1200° C. The reducing atmosphere or oxygen partial pressure atmosphere may result in a valence change in the cerium, ruthenium and titanium during firing.

It is to be understood that the foregoing description is intended to illustrate and not to limit the scope of the invention, which is defined by the scope of the appended claims. Other embodiments are within the scope of the following claims. For example, any combination of the various washcoat precursors may be utilized. Further, each of the washcoat precursor materials may be sintered in either oxidation or reduction, depending upon the desired results.

What is claimed is:

1. A method of fabricating a porous substrate comprising:
   providing a fiber material;
   providing at least one extrusion aid;
   providing at least one washcoat precursor;
   mixing the fiber material, the at least one extrusion aid and the at least one washcoat precursor to provide an extrudable batch;
   extruding the extrudable batch into a green substrate; and
   firing the green substrate to form a porous rigid substrate and to form a washcoat at least partially coating the fiber material.

2. The method of claim 1, further comprising mixing a fluid with the extrudable batch of fiber material, at least one extrusion aid, and at least one washcoat precursor.

3. The method of claim 1, wherein the fiber material includes one or more of a metallic fiber, an intermetallic fiber, a high temperature polymeric fiber, a resin fiber, a carbon fiber and a ceramic fiber.

4. The method of claim 1, wherein the at least one washcoat precursor includes at least one of sodium oxide, aluminum phosphate, aluminum nitrite, aluminum chloride, perovskites, zeolite, alumina sol, boehmite, cerium oxide, ruthenium oxide, silica, silica sol, alumina, zirconium oxide, hafnium oxide, activated carbon, barium oxide and titanium oxide.

5. The method of claim 1, wherein the rigid substrate has a porosity of greater than 40 percent.

6. The method of claim 1, wherein firing the green substrate includes: drying the green substrate; heating the green substrate including volatilizing at least a portion of the at least one extrusion aid; and sintering the green substrate to form bonds between the at least one washcoat precursor and the fiber material.

7. The method of claim 6, wherein the green substrate is sintered at a temperature below 1000° C.

8. The method of claim 6 wherein the green substrate is sintered to form at least one of glass bonds and ceramic bonds between the at least one washcoat precursor and the fiber material, strengthening the rigid substrate.

9. A porous washcoat-bonded fiber substrate comprising:
   an extruded composition of a fiber material, at least one extrusion aid, at least one washcoat precursor material, the extruded composition being fired to enable bond formation between the fiber material to provide strength and porosity.

10. The porous washcoat-bonded fiber substrate of claim 9, wherein the extruded composition includes a fluid.

11. The porous washcoat-bonded fiber substrate of claim 9, wherein the washcoat precursor material acts as a bonding phase material, coating the fiber material.

12. The porous washcoat-bonded fiber substrate of claim 9, wherein the fiber material includes one or more of a metallic fiber and a ceramic fiber.

13. The porous washcoat-bonded fiber substrate of claim 9, wherein the at least one washcoat precursor material includes at least one of sodium oxide, aluminum phosphate, aluminum nitrite, aluminum chloride, perovskites, zeolite, alumina sol, boehmite, cerium oxide, ruthenium oxide, silica, silica sol, alumina, zirconium oxide, hafnium oxide, activated carbon, barium oxide and titanium oxide.

14. The porous washcoat-bonded fiber substrate of claim 13, wherein the at least one washcoat precursor material is includes a pore former.

15. The porous washcoat-bonded fiber substrate of claim 9, wherein the porous fiber washcoat-bonded substrate has a porosity of greater than 40 percent after firing.

16. The porous washcoat-bonded fiber substrate of claim 9, wherein the extruded composition is fired to: dry the extruded composition; heat the extruded composition to volatilize at least a portion of the at least one extrusion aid; and sinter the extruded composition to form bonds between the at least one washcoat precursor material and the fiber material.

17. The porous washcoat-bonded fiber substrate of claim 16, wherein the extruded composition is sintered at a temperature below 1000° C.

18. The porous washcoat-bonded fiber substrate of claim 16, wherein the extruded composition is sintered to form at least one of glass bonds and ceramic bonds between the at least one washcoat precursor material and the fiber material.

* * * * *